June 10, 1924.

F. J. TILLMAN 1,497,045

COMPUTING AND MEASURING MACHINE

Filed March 17, 1920   3 Sheets-Sheet 1

Inventor
Ferdinand J. Tillman

June 10, 1924.

F. J. TILLMAN

COMPUTING AND MEASURING MACHINE

Filed March 17, 1920   3 Sheets-Sheet 2

Inventor
Ferdinand J. Tillman

June 10, 1924.

F. J. TILLMAN

COMPUTING AND MEASURING MACHINE

Filed March 17, 1920

Inventor

Ferdinand J. Tillman

Patented June 10, 1924.

1,497,045

UNITED STATES PATENT OFFICE.

FERDINAND J. TILLMAN, OF ST. LOUIS, MISSOURI, ASSIGNOR TO YARD-O-METER CORPORATION, OF ST. LOUIS, MISSOURI.

COMPUTING AND MEASURING MACHINE.

Application filed March 17, 1920. Serial No. 366,465.

*To all whom it may concern:*

Be it known that I, FERDINAND J. TILLMAN, a citizen of the United States, and a resident of the city of St. Louis and State of Missouri, have invented certain new and useful Improvements in a Combination Computing and Measuring Machine, of which the following is a specification.

The primary object of this invention is to provide a measuring and computing machine for measuring yardage and computing the price of articles sold by the yard or fraction thereof, such as fabrics, etc.

Other and further objects will appear in the specification and be specifically pointed out in the appended claims, reference being made to the accompanying drawings, exemplifying the invention, and in which—

Figure 1:
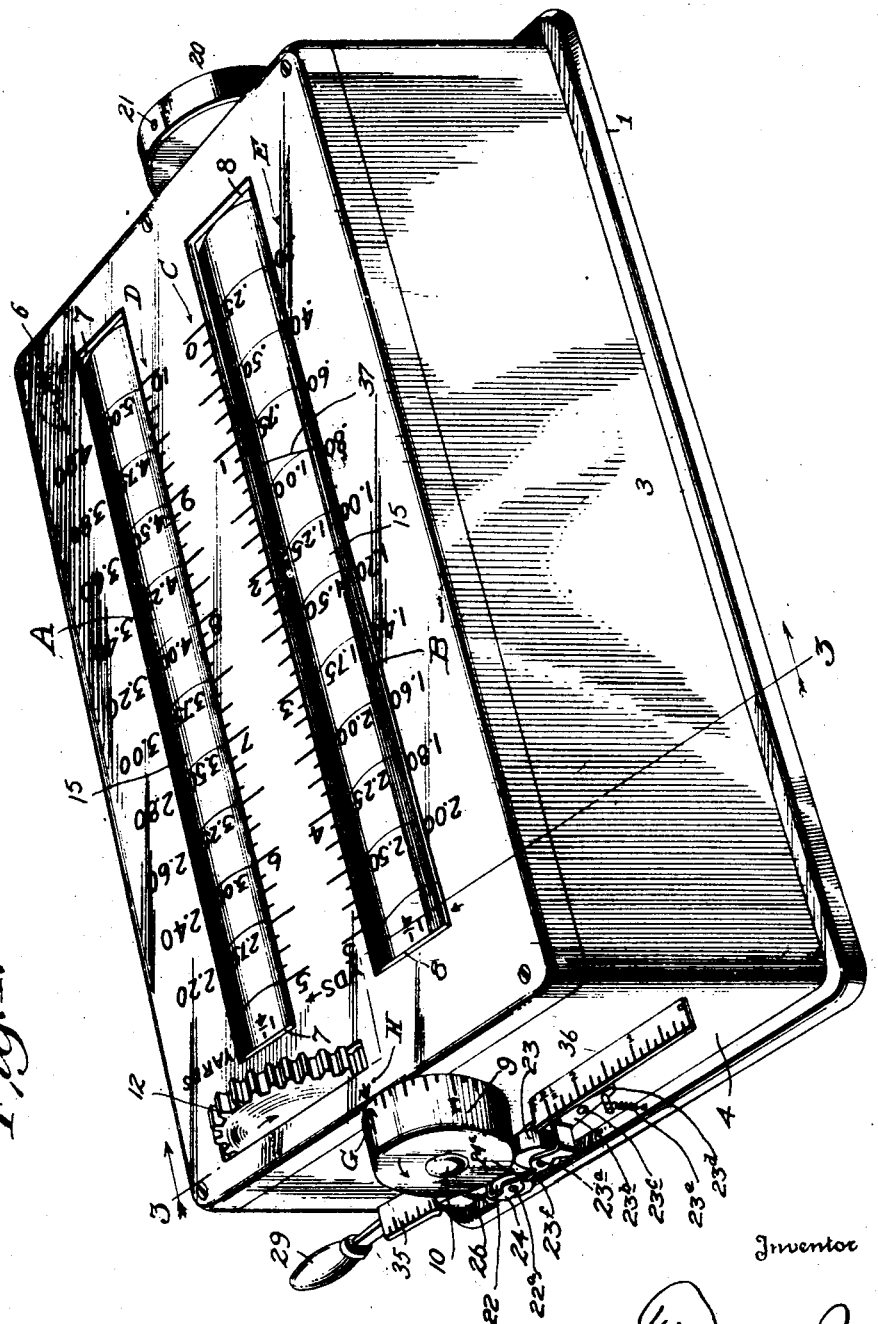
Figure 1 is a perspective view of the measuring and computing machine, showing two yardage scales, two price scales, and a movable price computing sheet moved to show that one and one quarter yards have been measured.

Referring to the drawings, it will be seen that all the mechanism is carried within or upon a casing of which 1 designates the base, 2 and 3 the side walls, 4 the front wall, 5 the back wall, and 6 the top wall through which are formed two parallel longitudinal sight openings 7 and 8. Yard scales C and D, and price scales E and F are placed adjacent opposite longitudinal edges of said sight openings. At the front of the casing is a measuring friction roller 9 splined to a shaft 10. Shaft 10 passes through and has for its bearing the front wall 4, on the inner end of which shaft within the casing is rigidly fastened a gear 11. The gear 11 is in mesh with a larger gear 12 keyed to a shaft 13, the latter being rotatably mounted on bearings on the front and back walls in any well known manner. Within the casing extending nearly the length thereof and rigidly fastened to the shaft 13 between the front wall 4 and the back wall 5 and below sight opening 7 is a drum 14 around which is to be wound in one direction a movable computing sheet 15, one end of which sheet is fastened to the periphery of the drum. One side A of the movable computing sheet 15 is readable through the sight opening 7. The opposite end of the movable computing sheet 15 is fixed to and wound in the opposite direction around a second drum 16, similar in all respects to drum 14, so that the side B of the movable computing sheet 15 is readable through the sight opening 8, below which the drum 16 is placed. The drum 16 is rigidly mounted on a shaft 17, rotatably mounted in bearings in the front wall 4 and the back wall 5. On the rear end of the shaft 17 is mounted a coiled spring 18, its inner end being fastened to shaft 17 by a pin 19, and the outer end to a housing 20 by a pin 21. The housing 20 is fastened to the back wall 5. The tension of the spring 18 is such as to normally hold the drum 16 with the price computing sheet 15 wound around it.

Figure 2:
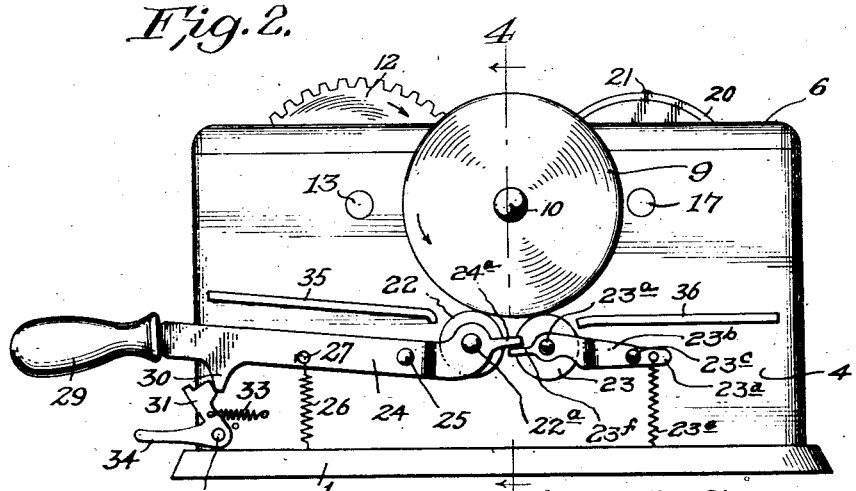
Fig. 2 is a front view of the computing and measuring machine showing the measuring roller and the friction rollers between which rollers goods to be measured is drawn.
Figure 3:
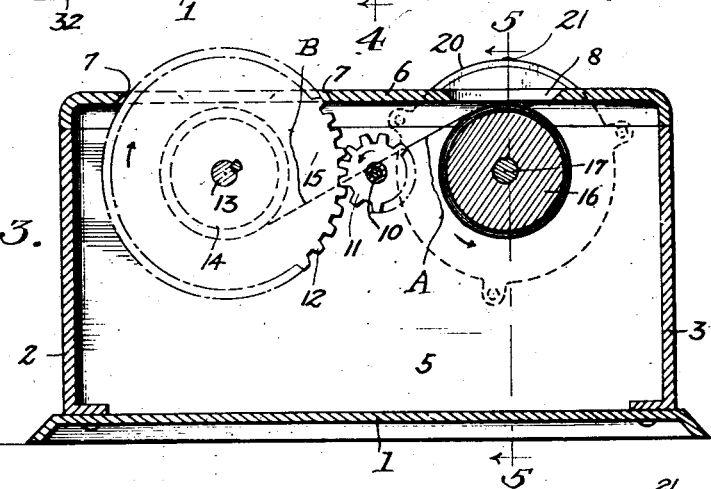
Fig. 3 is a sectional view taken approximately on the line 3—3 of Figure 1.
Figures 4, 5:
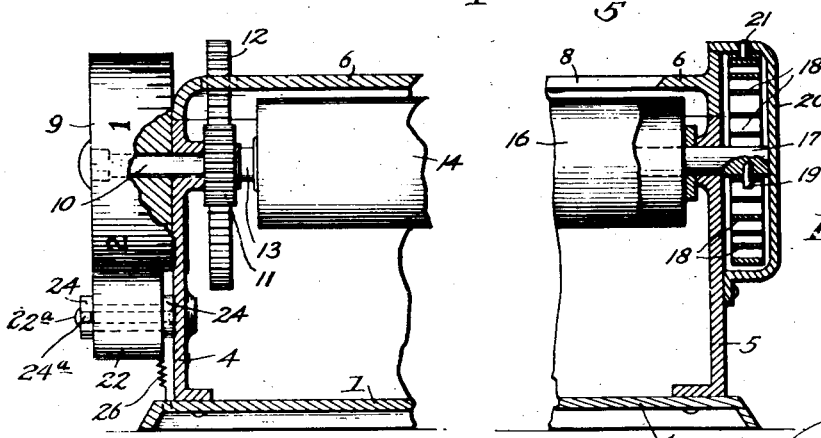
Fig. 4 is a sectional view through the front end of the machine taken approximately on the line 4—4 of Fig. 2.
Fig. 5 is a sectional view through the rear end of the machine taken approximately on the line 5—5 of Fig. 3.
Figures 6, 7, 8:
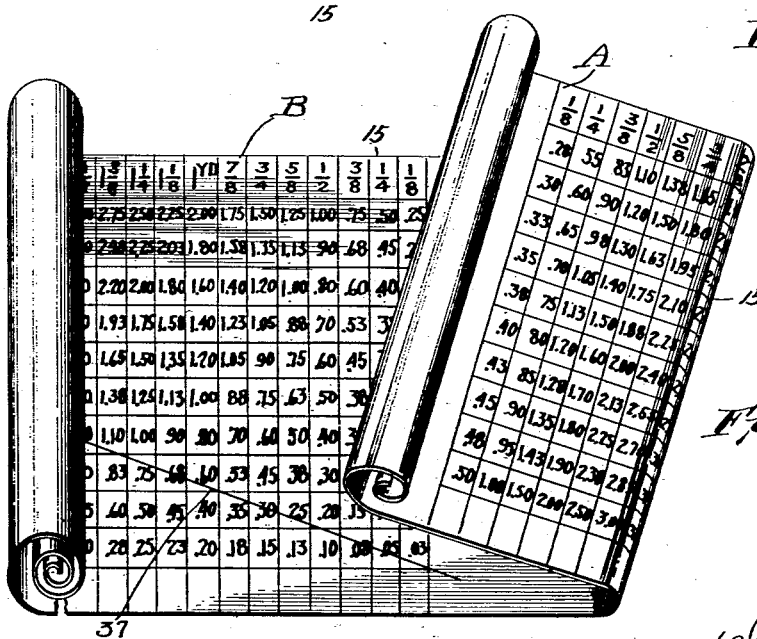
Fig. 6 is a view of one side of the movable computing sheet, showing an indicating guide line used in connection with this invention.
Fig. 7 is a view of the opposite side of the movable computing sheet, and shows a second indicating guide line used in connection with this invention, the chart being turned end for end.
Fig. 8 is a perspective view of the movable price computing sheet folded upon itself to expose both sides thereof.

Fulcrumed on a pin 25 projecting from the front wall 4 is a lever 24, best shown in Fig. 2 on the rear end of which is journaled at 22ª a friction roller 22 that is held in frictional contact with the bottom of the measuring roller 9 by a spring 26 attached to a stud 27 on the lever 24 and to the base 1. A second lever 23ᵇ is pivoted at 23ᶜ to the front wall 4 in line with lever 24 and carries on a pivot 23ᵃ a friction roller 23 that also bears against the bottom of the measuring roller. A spring 23ᵉ holds the roller 23 in contact with the measuring roller. On the outer end of the lever or arm 24 is a lifting handle 29, while projecting from its inner end is a short finger 24ª. A similar finger 23ᶠ is formed on lever 23ᵇ and extends towards finger 24ª and lies below it, being slightly separated therefrom to permit limited independent movement of the rollers. 30 is a downward extension on the arm 24, through which the arm 24 is adapted to be locked in an upward position with its friction roller 22 separated from the measuring roller 9 by a locking pawl 31 pivoted at 32 to the front wall 4, and is provided with a pull spring 33 which tends to hold the locking pawl 31 in contact with or under the extension 30. 34 is a push arm extending outwardly from the lock pawl 31 for manually operating the pawl. 35 is a shelf attached to the front wall 4 on one side of measuring roller 9, and 36 is a second shelf similarly disposed against the front wall on the opposite side of the measuring roller.

If an operator desires to measure, say one and one-quarter yards of cloth, she raises the handle 29, which causes the friction rollers 22 and 23 to move away from the measuring roller 9, finger 24ª depressing finger 23ᶠ and roller 23. The pawl 31 will then swing under extension 30 and hold the friction rollers 22 and 23 in the lowered position. One edge of the cloth to be measured is then placed upon the shelves 35 and 36 under the roller 9 and over the rollers 22 and 23 with the end of the cloth even with the outer end of the shelf 36. The extension 34 on the lock pawl 31 is then pressed downwardly to cause the pawl 31 to release the extension 30 of the arm 24 so that spring 26 can again return the friction rollers 22 and 23 to their normal raised position (or against the cloth to be measured). The cloth to be measured is then drawn below the roller 9, above rollers 22, 23 and over shelves 35, 36.

As the roller 9 is revolved by the cloth being measured, the shaft 10 which is securely fastened to the roller 9 is also revolved. Gears 11 and 12 are also revolved and thereby cause drum 14 to revolve and wind the movable price computing sheet 15 around said drum 14 and unwind it from drum 16. As the movable price computing sheet 15 is wound around the drum 14, an indicating line 37 which leads from the first one-eighth yard measurement of the computing sheet drawn diagonally across the face B of the sheet 15, will gradually move as seen through slot 8 to a higher position relative to its yard scale C, as shown in Fig. 1, and when this indicating line 37 has been moved up until it is pointing to the one and one-quarter mark on the yard scale C, then the operator will know that one and one-quarter yards of cloth has been measured, and can tell at once the price of the goods so measured by referring to the price scales E and F. As an example, if the goods measured was 20 cents a yard, the price 25 would be shown on the price computing sheet 15, opposite the mark 20 on the price scale E, indicating that one and one-quarter yards at 20 cents equals 25 cents. If the price of the cloth measured be 40 cents per yard, it will be noted opposite the price 40 on scale E, the figure 50 which indicates that one and one-quarter yards at 40 cents per yard is 50 cents, and if the price should be 60 cents per yard, or 80 cents per yard, or $1.00 per yard, or any price throughout the scales E and F, the price equal to one and one-quarter yards will be found opposite the price per yard on the scales E and F.

To make positive that the operator stops the measuring roller 9 accurately, it is provided with graduations indicating eighths of inches, and each revolution of the roller 9 is equivalent to one-eighth of a yard. The arrow G on the roller 9 when lined up properly with the arrow H on the top wall 6 will assure the operator that the proper amount of goods to the eighth of a yard has been measured. Or when G registers with H an exact number of eighths of yards has been measured.

When the indicating line 37 has been moved until it is opposite the 5-yard mark on the scale C, then line 37 has reached its end and does not further appear on measurements over 5 yards. But when the indicating line 37 has reached the 5-yard mark and disappeared, another indicating line 38, which is on the other side or face A of the computing sheet 15, will appear through sight opening 7 opposite the 5-yard mark on scale D. This second indicating line 38 will then register on scale D the amount of all yardage measured between five and ten yards. It will, therefore, be understood that through these indicating lines 37 and 38, it can be seen how many yards have been measured up to 10 yards.

Preferably, the shelves 35 and 36 have their upper surfaces graduated, as shown in Fig. 1, for convenience in measuring small fractional lengths of material when the desired amount required is less than even yards and eighths thereof, the scales C and D being divided into eighths. It is also useful when a remnant less than one eighth of a yard remains after the last measurement. The goods being cut at the outer end of shelf 36, the length of the fraction remaining will be indicated on the scales of shelves 35 and 36.

What I claim is:—

1. In a calculating device, a movable computing sheet having an indicating line extending diagonally on each side thereof, said lines inclining in opposite directions, and a respective fixed scale for co-operation with each of said lines, said lines being disposed on said sheet in a manner wherein only one of said lines at a time will co-operate with its respective scales.

2. In a calculating device, a movable computing sheet having a diagonal indicating line extending lengthwise on each side thereof, each of said lines being located adjacent opposite ends of the sheet, a pair of spaced apart fixed scales co-operable with one of the indicating lines of said sheet, and another pair of spaced apart fixed scales co-operable with the other indicating line of said sheet during the travel of the sheet transversely of said scales, and there being means provided whereby said sheet is moved.

3. In a calculating device, a movable computing sheet having an indicating line extending diagonally on each side thereof, and a respective fixed scale for co-operation with each of said lines, said lines being disposed on said sheet in a manner wherein only one of said lines at a time will co-operate with its respective scales.

4. A calculating device comprising a housing provided with a sight opening, a scale arranged lengthwise of each side of said opening, a computing sheet movable transversely beneath said opening and provided with a diagonally extending line which is of a length so as to travel the length of said scales as said sheet is moved transversely thereof, said line of said sheet being simultaneously co-operable with both of said scales, a second sight opening formed in said housing, and a second diagonal line disposed on said sheet for co-operation with said second sight opening after said first mentioned line has travelled the length of said scales.

5. In a calculating device, a movable computing sheet having an indicating guide line extending diagonally on each side of the sheet so as to indicate lengthwise thereon, said lines inclining in opposite directions, a pair of fixed scales for co-operation with one of said lines, and another pair of fixed scales for co-operation with said other line as said sheet is moved transversely of said scales.

6. In a calculating device, a movable computing sheet having a series of parallel measuring lines on each side extending crosswise of the direction of movement of the sheet and a diagonal indicating line arranged lengthwise of the sheet on each side thereof and crossing the measuring lines on respective sides of the sheet, a pair of fixed measuring scales cooperative successively with one of said indicating guide lines, another pair of fixed scales for successive co-operation with said other diagonal indicating line, readable in a direction to said first mentioned scales as the sheet continues to move in one direction, and means for moving said sheet.

7. In a calculating device, a movable computing sheet having a series of parallel measuring lines with measuring numerals and price computations on each side, said lines extending crosswise of the direction of movement of the sheet and a diagonal indicating line extending lengthwise of the sheet, each crossing the measuring lines on respective sides of the sheet, each of said diagonal lines being arranged adjacent opposite ends of the sheet, a fixed scale co-operative with one of said indicating lines and readable in one direction, a second fixed scale cooperative with the other indicating line and readable in the opposite direction, and means for moving said sheet continuously in one direction throughout the computing operation of the sheet with said scales.

8. A calculating device comprising a housing provided with a sight opening, a scale arranged lengthwise of each side of said opening, a computing sheet movable transversely beneath said opening and provided with a diagonally extending line which is of a length so as to travel the length of said scales as said sheet is moved transversely thereof, said line of said sheet being simultaneously co-operable with both of said scales.

FERDINAND J. TILLMAN.